D. G. HUSSEY.
Horse Rake.
No. 44,728.
Patented Oct. 18, 1864.
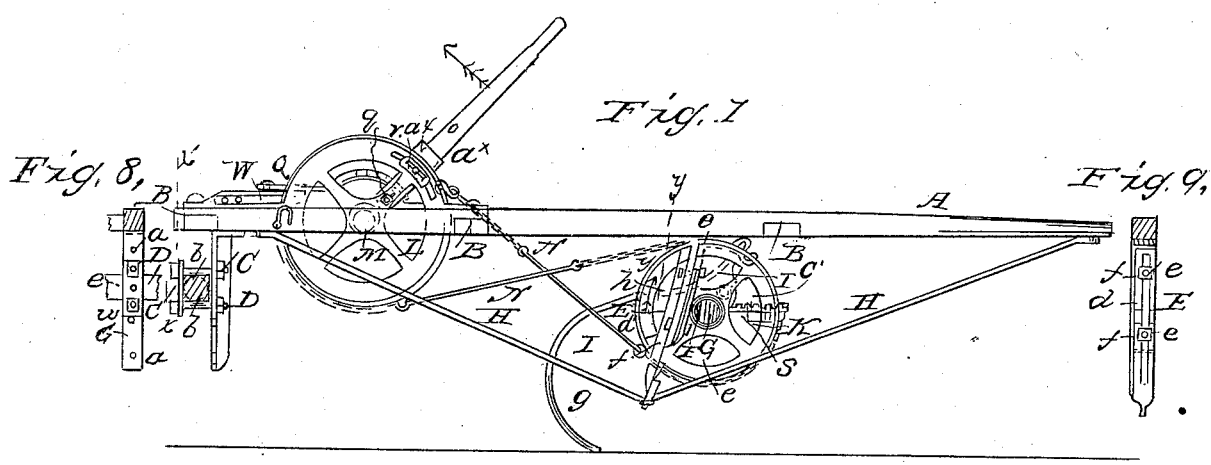
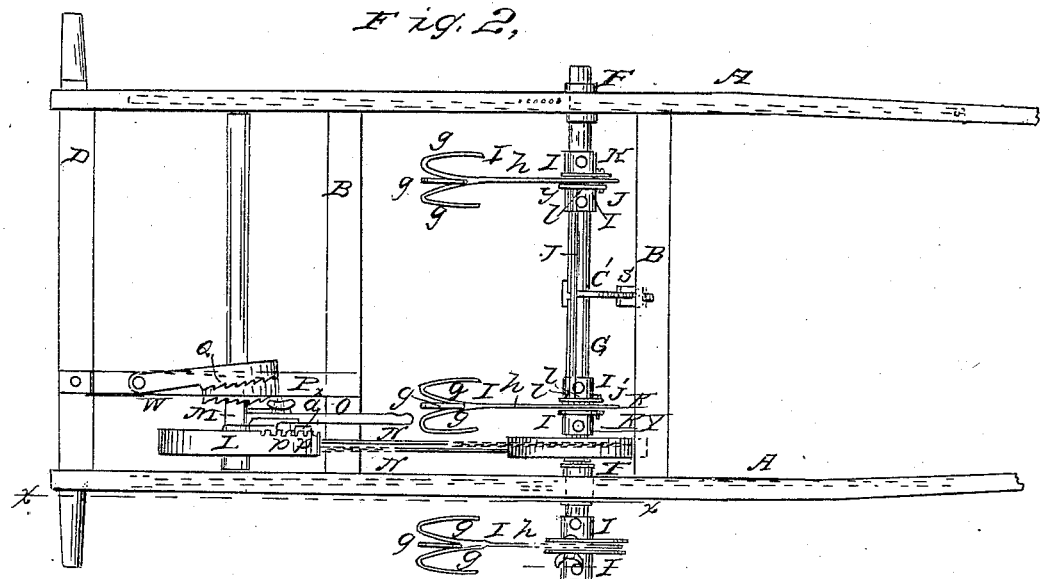
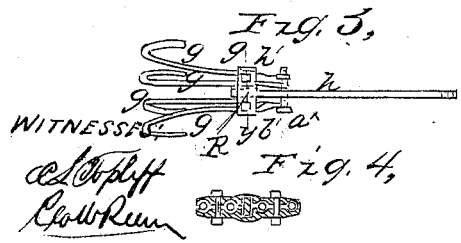
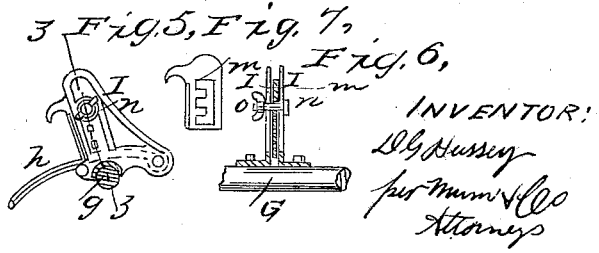

UNITED STATES PATENT OFFICE.

DAVID G. HUSSEY, OF NANTUCKET, MASSACHUSETTS.

IMPROVEMENT IN HORSE-RAKES.

Specification forming part of Letters Patent No. 44,728, dated October 18, 1864.

*To all whom it may concern:*

Be it known that I, DAVID G. HUSSEY, of Nantucket, in the county of Nantucket and State of Massachusetts, have invented a new and Improved Horse Hay-Rake; and I do hereby declare that the following is a full, clear, and exact description thereof, which will enable any one skilled in the art to make and use the same, reference being had to the accompanying drawings, making part of this specification, in which—

Figure 1 is a side sectional view of my invention, taken in the line $x$ $x$, Fig. 2; Fig. 2, a plan or top view of the same; Fig. 3, a detached view of a rake pertaining to the same. Fig. 4, a section of Fig. 3, taken in the line $y$ $y$; Fig. 5, a detached side view of one of the locks pertaining to the rakes; Fig. 6, a section of Fig. 5, taken in the line $y$ $y$; Fig. 7, a detached view of a part pertaining to the lock; Fig. 8, a section of a portion of the device, taken in the line $x'$ $x'$, Fig. 1; Fig. 9, a section of a portion of the device, taken in the line $y'$ $y'$, Fig. 1.

Similar letters of reference indicate corresponding parts in the several figures.

This invention relates to a new and improved horse hay-rake for raking hay in the field; and it consists in the employment or use of a series of rakes applied to a shaft in a novel way, and arranged and operated in such a manner that they will be under the complete control of the operator, and capable of being operated with the greatest facility.

A A represent two thills, the back parts of which are connected by cross-bars B. These parts constitute the thills and frame combined.

To the back part of each thill A there is attached a pendent metal bar, C. These bars are perforated with a series of holes, $a$, to receive screws $b$, which pass through plates $c$, said screws and plates forming clamps by which the axle D is secured to the machine, as will be understood by referring to Figs. 1 and 8. By this arrangement it will be seen that axles of different sizes may be attached to the machine, and the axle also adjusted higher or lower to suit wheels of different diameter.

To the thills A A, just back of the front cross-bar, B, there are secured two curved pendants, E E, one to each thill. These pendants are notched at their front sides, as shown at $a''$, and each pendant has a bearing, F, connected to it to receive a shaft, G, the latter being allowed to turn freely in the former. These bearings are attached to the pendants E E in such a manner as to be adjustable, and one way of effecting this is shown in Figs. 1 and 9, in which the pendant E has a longitudinal slot, $d$, in it to allow screws $e$, which pass through flanges $e'$ of the bearing, to pass through the pendant, said screws having nuts $f$ on them at both sides of the pendant, the lower ends of the flanges $e'$ fitting in the notches $a''$. (See Fig. 1.) The pendants E E are braced by rods H. These rods serve as stays for the thills, as well as for braces for the pendants, as will be seen by referring to Fig. 1.

I represents a series of rakes, which are composed each of a suitable number of tines or teeth, $g$, connected to an arm, $h$. The teeth $g$ are of curved form, as shown clearly in Fig. 1, and the arms $h$ are attached to the shaft G in such a manner that they will allow the rakes to rise and fall freely to conform to the inequalities of surface over which they may pass, and still admit of the rakes being raised, when desired, free from the surface of the ground by the turning of the shaft G. Various plans may be devised for this purpose, one of which consists of a socket formed of the plates $i$ $i$, notched at their back edges to receive a stop-bar, J, the ends of which are fitted loosely on pins $j$ between the plates $i$ $i$. The arms $h$ are fitted on pivots $k$ between plates $i$. The stop-bar J may be fitted in any of a series of notches, $l$, in the back edges of the plates $i$, so as to give the rakes I a greater or less degree of play, as may be desired.

Another plan for controlling or limiting the play of the arms $h$ is shown applied to a rake, I, at the outer sides of the thills. (See Figs. 5, 6, and 7.) In this arrangement the plates $i$ $i$ have a notched slide, $m$, fitted between them, through which and the plates $i$ $i$ a screw, $n$, passes, the latter having a nut, $o$, at one end. The slide $m$ serves as the stop, and is adjusted higher or lower by fitting different notches on the screw $n$. The slide is held firmly in place by screwing up the nut $o$.

The shaft G is turned so as to elevate the rakes in order to discharge their load by means of a wheel, K, on said shaft, and a wheel, L, on a shaft, M, at the back part of the frame, said wheels being connected by cross-rods and chains N N, as shown in Fig. 1. The wheel L has a series of notches, $p$, made in one side of its periphery, and a lever, O, is attached to the wheel L by a pivot, $q$, and a clamp, P, is attached to the lever, with teeth $a^x$ for engaging with the notches $p$ and holding the lever O in different positions relatively with wheel L to suit the convenience of the driver. This clamp P has a screw, $r$, passing through it, and a concentric curved slot, $s$, in the wheel L, and by means of a nut, $t$, on screw $r$ the clamp and lever may be secured at different points within the scope of the movement allowed them by the slot $s$.

The lever O and wheel L may be held at any desired point in order to keep the rakes elevated by means of a notched plate, Q, attached by a pivot, $u$, to the back cross-bar, B, and a plate, $v$, on the outer plate of the clamp P. By shoving the notched plate Q in contact with the plate $v$ a lip on the latter will engage with the notches in plate Q and hold the wheel L. On releasing the plate Q it may be forced outward from plate $v$ by means of a spring, $w$.

The tines or teeth $g$ of the rakes I are made separate from the arms $h$ and attached to the latter by a single bolt, $a'$, (see Fig. 3,) the tines or teeth being secured in a proper relative position with each other by means of a clamp, R, formed of two bars connected together by screw-bolts $b'$, as shown clearly in Fig. 4.

In order to counterpoise the rakes I on the shaft G, I attach a weight, S, to the latter, the weight being adjustable on an arm, $c'$. (See Figs. 1 and 2.)

Having thus described my invention, what I claim as new, and desire to secure by Letters Patent, is—

1. Attaching the axle D to the frame by means of perforated pendent bars C C, plate $c$, and screws $b$, substantially as and for the purpose specified.

2. The holding of the lever O in different positions relatively with the wheel L by means of the clamp P, provided with teeth $a^x$, notches $p$ in the side of the periphery of the wheel, and the screw $r$, passing through the slot $s$ in wheel L, with the nut $t$ on its end, substantially as described.

3. The attaching of the arms $h$ to the shaft G by means of a lock composed of a slide, $m$, or other equivalent device, in connection with a socket formed of plates $i$ $i$, substantially as shown, to admit of a vertical play or movement of the rakes, and also to admit of the elevating of the same by the turning of shaft G, as set forth.

4. The attaching of the bearings F of the shaft G to curved notched bars E, substantially as shown, to admit of the adjustment of shaft G and the rakes I, as set forth.

5. Securing the tines or teeth $g$ to the arms $h$ by means of the clamp R and bolt $a'$, as herein described.

DAVID G. HUSSEY.

Witnesses:
 REUBEN CHASE,
 JAMES AUSTIN.